United States Patent Office 2,986,532
Patented May 30, 1961

2,986,532
CRACKING CATALYST

Albert Gosselin, Moulineaux, France, assignor to Societe Chimique de la Grande Paroisse (Azote et Produits Chimiques), Paris, France, a French company No Drawing. Filed May 28, 1956, Ser. No. 587,452
Claims priority, application France June 1, 1955
1 Claim. (Cl. 252—457)

My invention has for its object a method for the catalytic treatment of hydrocarbons with a view in particular to preparing either ethylene or gasiform mixtures with high contents of ethylene which mixtures are adapted, if required, to be used for the production of illuminating gas.

Various industrial methods have already been proposed for the cracking of hydrocarbons with a view to preparing ethylene or gases with a high calorific capacity. Such methods resort to empty tubes through which flow vaporized hydrocarbons while the temperature of the fluid passing out of the tubes varies generally between about 800 and 850° C. Said methods show the drawback consisting in that the ethylene contents of the gas obtained do not rise in practice above 28 to 30% and furthermore there is a substantial formation of tar, coke, etc.

My invention has for its object to cut out these drawbacks and to allow the execution of a cracking under conditions providing under atmospheric or subatmopheric pressure either a gas with high contents of ethylene or else a gas with a high calorific capacity adapted to be used for the production of illuminating gas or else through subsequent treatment for the obtention of synthetic gases.

My invention consists primarily in resorting in the cracking reaction to catalysts the presence of which allows transformations at a temperature which is substantially lower than in the case of conventional methods, such temperatures being lower by say 100 to 200° C. than the usual ethylene producing cracking temperatures, these transformations being executed within very short periods. This application of such catalysts may be associated with the dilution of the hydrocarbon to be treated in steam, in an inert gas or possibly in hydrogen. It is thus possible to obtain, in addition to the above disclosed improved efficiency, a high yield and a reduction in the cost of heating.

According to my invention, I resort to catalysts showing the following features:

They must have a high power of breaking open the links between two carbon atoms and of furthering more particularly:

(a) The fragmentation of the elongated aliphatic chains and of the naphthenic rings, (b) The separation of the lateral aliphatic chains linked to aromatic nuclei.

With a view to cutting out the formation of carbon deposits they should further catalytically the following reaction in the presence of steam.

$$C + H_2O \rightarrow CO + H_2 \qquad (1)$$

Now, it has been found that the catalysts furthering to a substantial extent the transformation reaction:

$$CO + H_2O \rightarrow CO_2 + H_2 \qquad (2)$$

also further the Reaction 1.

Lastly, the catalysts should not show any dehydrogenizing capacity. As a matter of fact, the light hydrocarbon mixtures treated have a ratio $H/C = 1.97$ or thereabouts while the heavy distillates have a ratio $H/C$ ranging between 1.9 and 1.8; in other words, the ratio $H/C$ is in all cases lower than that of the ethylenic hydrocarbon to be obtained wherein $H/C = 2$.

An exaggerated dehydrogenizing activity would thus lead to the objectionable formation of free carbon.

According to my invention, these catalysts should be constituted chiefly by non-reducible oxides devoid of any hydrogenizing action at the temperature of operation, excluding any metal or of any oxide liable to be reduced under the conditions of operation. Furthermore, the catalysts should be capable of forming hydrates or hydroxides which are stable at high temperatures; or else the catalyst should be capable of absorbing water energetically so as to satisfy the condition of catalyzing the above Reaction 1. Furthermore, the oxides considered should be associated, so as to show the splitting activity according to said Condition 1. I may mention in particular among the non-reducible oxides which may be used for the purposes of my invention the following oxides:

The earth-alkaline oxides MgO—CaO—BaO.
Cerium and the like rare earth oxides $$Ce_2O_2—Pr_2O_2—Nd_2O_2$$

Silica and homologous oxides $$SiO_2—TiO_2—ZrO_2—CtO_2—ThO_2$$

and among these, I may select, according to the conditions of operation, two or more oxides to be associated with a view to obtaining the desired results.

Thus, it is possible by associating zirconia and magnesia, zirconia and lime or again zirconia and silica, to obtain catalysts satisfying the three above disclosed conditions. It will be remarked in particular that a mixture of $ZrO_2—3MgO$ contains still 10% of slightly bound water at 500° C.

As already mentioned, the use of such catalysts allows in conformity with my invention a lowering by about 100 to 200° C. of the temperature at which the hydrocarbon chains may be broken.

Under such conditions, the groups $CH_2$ produced by the thermic dissociation have a tendency to coalesce and to form simple molecules in which ethylene is predominant. With reference to non-catalytic cracking, a gain of 10 to 20% in the yield of ethylenic hydrocarbons is observed together with a reduction by 6 to 7% in the yield of higher olefines, so that the proportion of actual ethylene may be increased by 16 to 19% in the final gasiform mixture.

These results may be readily understood since it is a known fact that a raising of the temperature of pyrolysis of the hydrocarbon vapors increases the tendency to a reduction in the weight of the molecules and to a release of molecular hydrogen together with the formation of cyclic compounds and even of carbon black.

The use of the precedingly defined catalysts allows on the other hand executing a slightly dehydrogenizing pyrolytic treatment at a higher temperature with a considerably reduced formation of cyclic compounds and of tars, so that I obtain with a highly improved yield a gas the calorific capicity of which is adjustable as a function of temperature and is all the lower when the reaction has been executed at a higher temperature for which the hydrogen contents are higher.

The purification of the gases obtained is then much simpler by reason of the absence of any tar, while on the other hand, the reduction of the cyclisation phenomenon has for its consequence a reduction in the contents of thiophenic derivatives in the gas obtained so that it is easier to remove the sulfur from the latter;

the addition of hydrogen to the mixture to be cracked cooperates in directing the transformation of the sulfidic derivatives towards the formation of hydrogen sulfide, which latter product is easily removed in accordance with conventional technique.

It should also be considered in contradistinction that such catalysts are not suitable in the cases where it is necessary to provide for a high dehydrogenizing action, for instance when it is desired to produce synthetic gases with high contents of hydrogen or for the cracking of methane which requires chiefly a dehydrogenization into reactive $CH_2$ groups.

The catalysts resorted to have a practically indefinite life since they are not sensitive to the action of sulfur. Furthermore, they are adapted to be regenerated periodically through elimination of any possible deposits of carbon as provided by a roasting in an oxidizing medium at a temperature of about 1000 to 1200° C.

I will now disclose by way of example and by no means in a limiting sense a preferred method for the preparation of a catalyst according to my invention: I mix 12% by weight of zirconium oxide with 38% of magnesia and 50% of $SiO_4Zr$, I then reduce said mixture into the state of granular particles and I roast it at about 1400° C. Experience shows that the catalytic granules thus obtained are refractory to heating up to 2000° C. and have an excellent mechanical resistance. This catalyst has proved excellent in the cracking of heavy hydrocarbons.

Three non limiting examples of catalytic cracking operations according to my invention will now be disclosed, said examples incorporating the use of said catalyst.

First example:

I execute at a temperature of about 720° C. and at a high volumetric speed, say ten thousand volumes per hour of the mixture of hydrocarbon vapor and steam, the cracking of a light paraffinic mixture boiling between 40 and 100° C. This mixture is then transformed entirely into a gas containing 45 to 50% of ethylenic hydrocarbons of which 40 to 45% are constituted by ethylene without any polymerization oil or carbon black being produced, the calorific power of the gas produced being above 11,000 to 12,000 calories per cubic meter.

Second example:

Starting from the same light paraffinic mixture, boiling as precedingly between 40 and 100° C., the operation is performed at a higher temperature of about 850 to 870° C. I obtain then uniformly without the formation of any tar or condensable cyclic oils a gas containing 3 to 4% of $CO_2$, 18 to 20% of $C_nH_{2n}$, 9 to 12% of CO, 42 to 44% of $H_2$ and 22 to 23% of $CH_4$, said gas having a calorific capacity of 5000 to 6000 calories, which may be used to advantage for the preparation of illuminating gas.

Third example:

A paraffinic distillate having a specific weight $D_{15}=0.880$, containing 2% of sulfur and solidifying at $+10°$ C. is treated in admixture with five times its weight of steam at a total volumetric speed of 20,000 volumes of steam and hydrocarbon per hour while the temperature is kept within a range extending between 650 and 690° C.; I obtain thus a gas containing 60 to 65% of ethylenic hydrocarbons of which 45 of ethylene having a specific calorific capacity of about 13,000 calories while the simultaneous production of aromatic oils having a specific weight equal to 1 does not rise beyond 16%.

Through a recycling of the higher ethylenic hydrocarbons, the final yield of ethylene may reach 50% of the weight of hydrocarbons subjected to treatment. The operation is continuous since the catalyst is not affected by the sulfur in the distillate and is not loaded with carbon black. This last example is of particular interest since it shows that the invention is also applicable to the treatment of heavy sulfur-containing paraffinic petroleum products which form a raw product which is much cheaper than the gasolinic hydrocarbon mixtures.

Obviously, many modifications may be brought to my invention without widening its scope as defined in the accompanying claim.

What I claim is:

A catalyst for the catalytic cracking of vaporized hydrocarbons into ethylene-containing gases, consisting of a granulated and baked mixture of about 12% by weight of zirconium oxide, 38% of magnesia by weight and 50% of zirconium silicate by weight.

References Cited in the file of this patent

UNITED STATES PATENTS

| | | |
|---|---|---|
| 2,231,231 | Subkow | Feb. 11, 1941 |
| 2,353,509 | Schulze et al. | July 11, 1944 |
| 2,586,694 | Mottern | Feb. 19, 1952 |
| 2,611,738 | Webb et al. | Sept. 23, 1952 |
| 2,629,753 | Frevel et al. | Feb. 24, 1953 |
| 2,712,985 | Guebert | July 12, 1955 |
| 2,791,548 | Benz | May 7, 1957 |

OTHER REFERENCES

Mellor: "A Comprehensive Treatise on Inorganic and Theoretical Chemistry," vol. VI, pages 846, 847, and 857, pub'd by Longmans, Green & Co., London (1925).

Grue et al.: "Technology of Petroleum," page 108, pub'd. by McGraw-Hill Book Co. Inc., N.Y. (1942).